Dec. 3, 1957  H. R. FORTGANG ET AL  2,815,084
INDEPENDENT REAR WHEEL SUSPENSION FOR MOTOR VEHICLES
Filed Feb. 9, 1954
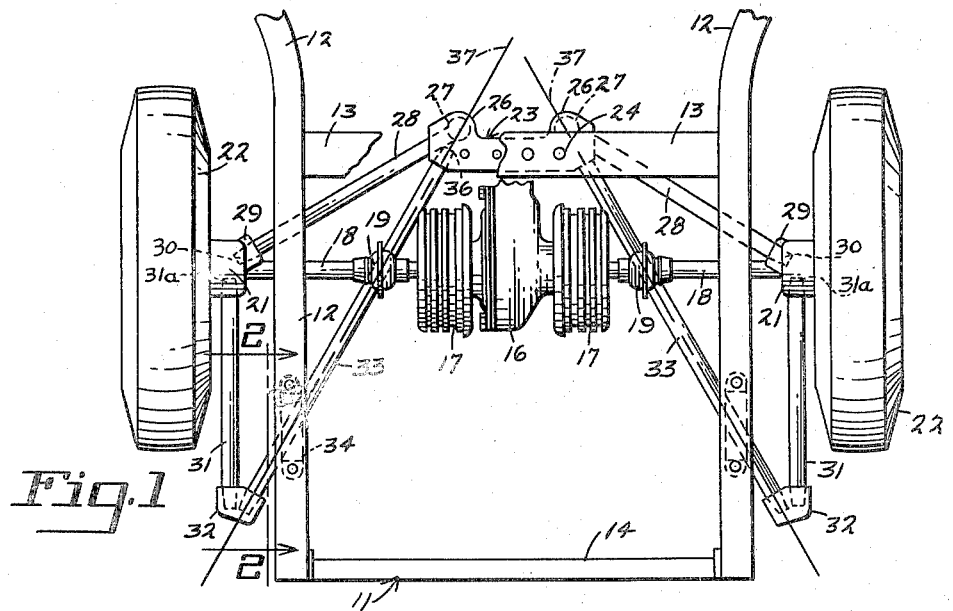
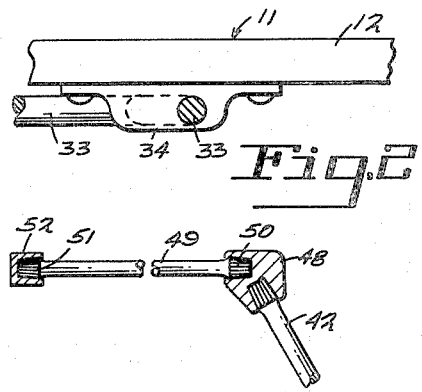
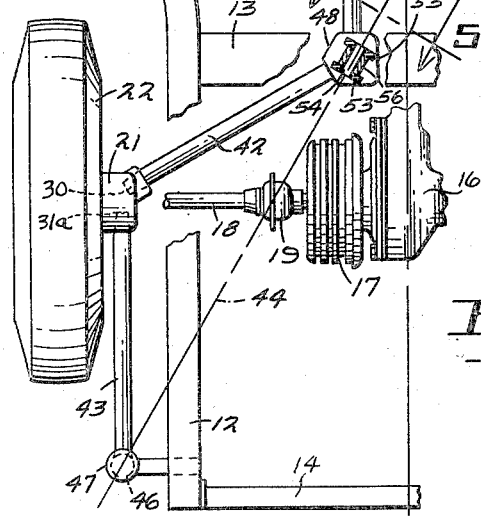
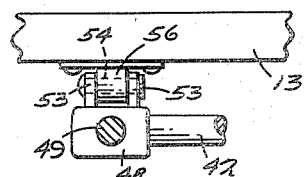
INVENTORS
H. R. FORTGANG
W. R. KOTOUCEK.
BY
E. C. McRae
J. R. Faulkner
T. H. Ooter
ATTORNEYS

United States Patent Office 2,815,084
Patented Dec. 3, 1957

2,815,084

INDEPENDENT REAR WHEEL SUSPENSION FOR MOTOR VEHICLES

Herbert R. Fortgang and Waldemar R. Kotoucek, Detroit, Mich., assignors to Ford Motor Company, Dearborn, Mich., a corporation of Delaware Application February 9, 1954, Serial No. 409,080

2 Claims. (Cl. 180—73)

This invention relates generally to motor vehicles, and has particular reference to an independent rear wheel suspension for a motor vehicle.

It is an object of the present invention to provide an independent rear wheel suspension incorporating a pair of control arms cooperating with each other to guide the rising and falling movement of the vehicle wheel, one of the control arms being connected to a torsion bar to impart torsional movement thereto during the rising and falling movement of the wheel. One of the control arms extends generally longitudinally of the vehicle adjacent the side frame rail and the other of the control arms extends generally transversely of the vehicle to form a triangulated suspension, the base of which forms the axis of pivotal movement of the control arms and the wheel carried thereby, with this axis passing substantially through the universal joint between the differential unit and the axle shaft driving the rear wheel. In one form of the invention the torsion bar is arranged coaxially with the axis of the base of the triangulated suspension, being anchored at one end to a frame member and connected at its opposite end to one of the control arms. In another form of the invention the inner end of the transversely extending control arm is pivotally mounted for rotation about the base of the triangulated suspension system and also is rigidly connected to the rearward end of the longitudinally extending torsion bar, the forward end of which is anchored to a frame member. The invention thus contemplates a suspension system independently suspending a rear vehicle wheel and economically manufactured of a minimum of components compactly arranged.

Other objects and advantages of this invention will be made more apparent as this description proceeds, particularly when considered in connection with the accompanying drawings, wherein:

Figure 1 is a plan view of the rearward portion of a motor vehicle chassis embodying the present invention, certain of the frame members broken away for clearness.

Figure 2 is a cross sectional view taken on the line 2—2 of Figure 1.

Figure 3 is a plan view of the rearward portion of a motor vehicle chassis, illustrating a modification of the invention.

Figure 4 is a fragmentary plan view, partly in section, of a portion of the construction shown in Figure 3, illustrating the end connections of the torsion bar, and;

Figure 5 is a view taken on the line 5—5 of Figure 3.

Reference is made herein to the copending application of E. S. MacPherson, Serial No. 362,510, for Independent Wheel Suspension for Motor Vehicles which is assigned to the assignee of this application and has since issued as Patent No. 2,757,747.

Referring now to the drawings, and particularly to Figure 1, the reference character 11 indicates generally the frame of a motor vehicle having side frame rails 12 and cross frame members 13 and 14. Conventional differential mechanism is contained within a differential housing 16 supporting at each side thereof a conventional brake unit 17. An axle shaft 18 is connected by means of a universal joint 19 to each side of the differential mechanism 16, and extends outwardly to a wheel supporting member or hub 21. The axle shaft 18 is journaled in the wheel hub 21 and connected to the adjacent rear wheel 22 to form a drive for the latter.

A mounting bracket 23 is secured by fastening elements 24 to the underneath side of the cross frame member 13. A spherical shaped embossment 26 is formed on the under side of the mounting bracket 23 and receives the ball shaped end 27 of a transversely extending control arm 28 to form a universal mounting for the inner end of the control arm. The control arm 28 extends outwardly from the mounting bracket 23 beneath the cross frame member 13 and the side frame rail 12 and is at its outer end received within an integral projection 29 formed on the wheel hub 21. The control arm 28 is nonrotatably connected to the projection 29 of the wheel hub by having its end portion 30 welded thereto. If desired the outer end of the control arm may be splined and received within a correspondingly splined bore formed in the wheel hub.

The wheel hub 21 also nonrotatably receives the forward end of a longitudinally extending control arm 31, the end portion 31a of the latter being welded or having a splined connection to the wheel hub. The control arm 31 extends longitudinally of the vehicle generally parallel to the side frame rail 12 and at its rearward end is nonrotatably received within a coupling 32.

The coupling 32 also nonrotatably receives the rearward end of a torsion bar 33 extending diagonally of the vehicle frame between the rearward end of the control arm 31 and the mounting bracket 23 adjacent the inner end of the control arm 28. Adjacent its connection to the rearward end of the control arm 31 by means of the coupling 32, the torsion bar 33 is journaled in a bracket 34 bolted to the underside of the side frame rail 12.

The forward end 36 of the torsion bar 33 is splined and nonrotatably received in a splined bore formed in the mounting bracket 23 secured to the underside of the cross frame member 13. It will be noted that the axis of the diagonally extending torsion bar 33 extends through the center of the ball joint connection 27 between the inner end of the control arm 28 and the mounting bracket 23. In addition, the axis of the torsion bar 33 extends vertically beneath the center of the universal joint 19 between the brake unit 17 and the axle shaft 18.

From the foregoing it will be seen that the control arms 28 and 31 and the torsion bar 33 form a triangulated suspension for the rear wheel 22. The base of this triangulated suspension is the diagonal axis 37 which coincides with the axis of the torsion bar and extends through the ball joint connection 27 at the inner end of the control arm 28. Rising and falling movement of the wheel 22 thus takes place about the axis 37 under the guiding control of the control arms 28 and 31. During this rising and falling movement the longitudinally extending control arm 31, being connected at its rearward end to the rearward of the torsion bar 33 by means of the coupling 32, rotates the rearward end of the torsion bar 33 about the axis 37 to place the torsion bar under torsional stress. The torsion bar 33 thus forms the spring suspension for the rear wheel 22 and cooperates with the control arm 28 and 31 in guiding the wheel during its rising and falling movement.

Although the axis 37 does not pass directly through the center of the universal joint 19 since the torsion bar 33 passes slightly beneath the joint it is close enough to provide geometrically an arrangement permitting coordinated swinging movement of the axle shaft 18 as the control arms 28 and 31 rise and fall with the vehicle wheel. The pivotal connections and the universal joint provide sufficient movement to compensate for the fact that the axis 37 is slightly offset from the center of the joint.

A modification of the invention is illustrated in Figure 3. In this modification the frame and wheel driving mechanism are identical with the construction shown in Figure 1 except that a third cross frame member 41 is shown forwadly of the intermediate cross frame member 13. A pair of control arms 42 and 43 are utilized, and are connected to the frame to form a triangulated suspension whose base comprises the diagonal axis 44.

The longitudinally extending control arm 43 is nonrotatably secured at its forward end to the wheel hub 21 and at its rearward end is formed with a ball 46 received within a socket 47 secured to the side frame rail 12, to form a universal connection at the rearward end of the control arm.

The generally transversely extending control arm 42 is nonrotatably secured at its outer end to the wheel hub 21 and at its inner end is splined or otherwise nonrotatably connected to a coupling 48. As best seen in Figure 4, the coupling 48 also nonrotatably receives the splined rearward end 50 of the longitudinally extending torsion bar 49, the forward end 51 of which is splined and nonrotatably anchored to a bracket 52 secured to the under side of the cross frame member 41.

Referring again to Figure 3, the coupling 48 is integrally formed with a pair of upstanding ears or flanges 53, spaced from each other along the diagonal axis 44. A pivot pin 54 extends between the ears 53 and also extends through the eye of a downwardly depending bracket 56 secured to the underside of the cross frame member 13.

As a result of this construction it will be seen that the coupling 48 is supported upon the cross frame member 13 for rotation about the diagonal axis 44. The control arms 42 and 43 and the wheel hub 21 and rear wheel 22 carried thereby thus rotate about the diagonal axis 44 during the rising and falling movements of the vehicle wheel. The construction is such that the diagonal axis 44 passes through the center of the universal joint 19 located between the brake unit 17 and the axle shaft 18.

The rising and falling movement of the rear wheel 22, and the consequent rotation of the control arm 42 and coupling 48 about the diagonal axis 44, imposes a combined torsional and bending stress upon the longitudinally extending torsion bar 49 since the forward end 51 of the latter is anchored to the cross frame member 41. The torsion bar 49 thus functions as a torsion spring to resiliently independently suspend the rear wheel 22.

It will be noted that the longitudinally extending torsion bar 29 is spaced laterally from the longitudinal center line 57 of the vehicle so as to provide clearance for the drive shaft or torque tube (not shown). The rear wheel on the opposite side of the vehicle is similarly mounted and connected to a similar torsion bar to form an independent suspension therefor.

It will be understood that the invention is not to be limited to the exact construction shown and described, but that various changes and modifications may be made without departing from the spirit and scope of the invention, as defined in the appended claims.

What is claimed is:

1. In a motor vehicle having a frame and a driven road wheel, a driving gear unit mounted upon said frame, a supporting member rotatably mounting said road wheel, an axle drivingly connected to said wheel, a universal joint interconnecting said axle and said driving gear unit, a control arm extending generally transversely of said vehicle and pivotally connected at its inner end to said vehicle frame on a diagonally extending axis passing substantially through the center of said universal joint, the outer end of said transversely extending control arm being nonrotatably secured to said wheel supporting member, a generally longitudinally extending control arm nonrotatably connected at one end to said wheel supporting member and having its opposite end pivotally connected to said vehicle frame on said diagonally extending axis, and a torsion bar having one end anchored to said frame and its opposite end connected to one of said control arms to be rotated thereby during the rising and falling movements of said road wheel.

2. The structure defined by claim 1 which is further characterized in that said torsion bar extends generally longitudinally of the vehicle adjacent the longitudinal center line thereof, a coupling member interconnecting the rearward end of said longitudinally extending torsion bar and the inner end of said transversely extending control arm, and means pivotally connecting said coupling member to said vehicle frame for rotation about the diagonally extending axis interconnecting said last mentioned pivotal connection and the pivotal connection between the end of the other of said control arms and said frame.

References Cited in the file of this patent

UNITED STATES PATENTS

| | | |
|---|---|---|
| 2,164,838 | Porsche | July 4, 1939 |

FOREIGN PATENTS

| | | |
|---|---|---|
| 414,985 | Great Britain | Aug. 16, 1934 |
| 493,412 | Great Britain | Oct. 7, 1938 |